United States Patent

[11] 3,579,070

[72] Inventors Weyman S. Crocker
Springfield, Vt.;
Philip H. White, Caremont, N.H.; William T. McDonald, Wayland, Mass.
[21] Appl. No. 721,479
[22] Filed Apr. 15, 1968
[45] Patented May 18, 1971
[73] Assignee Pneumo Dynamics Corporation
Cleveland, Ohio

[54] MACHINE TOOL SERVO SYSTEM INCLUDING FEED-RATE CONTROL
6 Claims, 5 Drawing Figs.
[52] U.S. Cl. .................................................. 318/571, 318/597
[51] Int. Cl. ........................................... G05b 19/24
[50] Field of Search ........................................ 318/20.286, 20.285; 318/20.110

[56] References Cited
UNITED STATES PATENTS

| | | | |
|---|---|---|---|
| 3,015,806 | 1/1962 | Wang et al. | 318/(20.110X) |
| 3,089,988 | 5/1963 | Stillings | 318/(20.286) |
| 3,122,691 | 2/1964 | Centner et al. | 318/(20.110) |
| 3,191,205 | 6/1965 | Gilbert | 318/(20.110X) |
| 3,204,132 | 8/1965 | Benaglio et al. | 318/(20.110X) |
| 3,267,344 | 8/1966 | McDaniel | 318/(20.110X) |
| 3,418,547 | 12/1968 | Dudler | 318/(20.110) |
| 3,002,115 | 9/1961 | Johnson et al. | 318/(20.110X) |

Primary Examiner—T. E. Lynch
Attorney—Stephen M. Mihaly

ABSTRACT: An electronic-hydraulic analog position servocontrol system for slide actuation of a machine tool of the automatic type having a sequential mode of operation including position and rate control of portions of the traverse of the slide. A spindle pulse generator and integrator circuit provide a ramp function rate control signal for combination with position information for synchronizing slide movement with rotation of the spindle.

INVENTORS
WEYMAN S. CROCKER
PHILIP H. WHITE
WILLIAM T. McDONALD

BY [signature]

ATTORNEY

Patented May 18, 1971
3,579,070
3 Sheets-Sheet 2
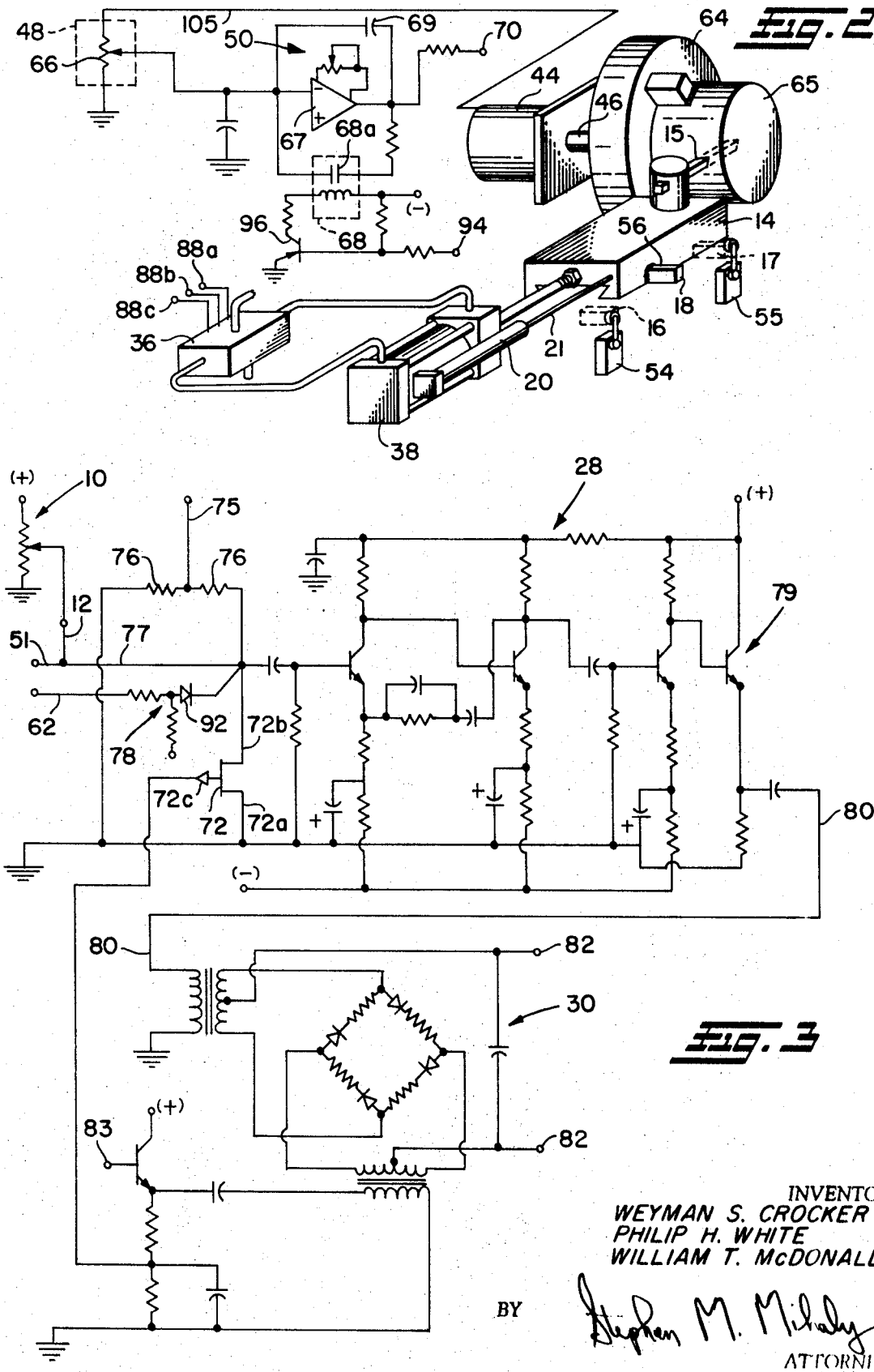
INVENTORS
WEYMAN S. CROCKER
PHILIP H. WHITE
WILLIAM T. McDONALD
BY Stephen M. Mihaly
ATTORNEY

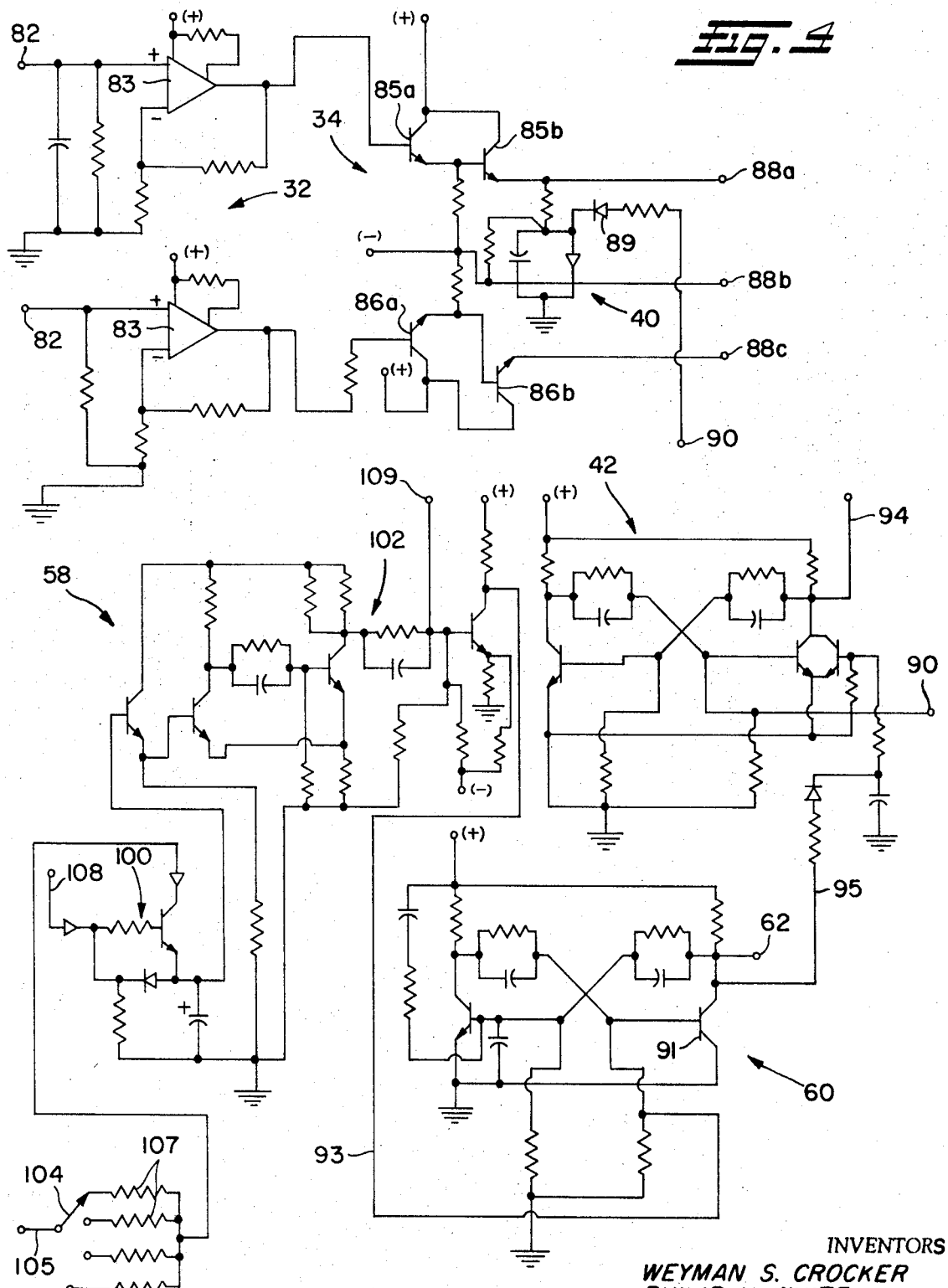

3,579,070

MACHINE TOOL SERVO SYSTEM INCLUDING FEED-RATE CONTROL

This invention relates to a control system for a machine tool and more particularly, to a control system for a machine tool of the automatic type such as a single spindle or a multispindle automatic.

In this type of machine, it is common to have a plurality of tool bearing slides which are linearly movable from retracted through workpiece engaging positions for performing the machining operation. In the single spindle type machines, the slide may be rotatively indexed in relation to the machine tool to perform a sequence of operations upon the workpiece carried by the spindle, whereas in the multispindle machine, the slides maintain a fixed rotative orientation and the workpiece-bearing spindles are indexed in relation to the machine tool.

Whether the machine is of the single or multispindle type, the traversing motion of the tool slides is similar for both the end working and the cross slides of the machine. It is typical in these machines that the slides start their motion from a fully retracted position and move throughout the entire length of travel for each cutting operation. In order to define a particular machining area, the tool is positioned on the slide so that the workpiece is traversed by the tool at the appropriate interval within the extent of travel of the slide. In these high production type machines, movement of the particular tool from a retracted position to the machining area is wasted machining time and it is usual to accomplish this movement at a rapid traverse rate. When the machining area is reached, the tool is moved at a feed rate, wherein rate of movement may be directly proportional to the spindle speed. Such movement continues for the remainder of the traverse until a limit is reached, and culminates in a dwell interval and a return to the retracted position at a rapid traverse rate.

It is an object of this invention to provide an improved control system for use in conjunction with single or multispindle type automatic machines.

It is another object of this invention to provide an improved machine tool control system having minimal cost with greater efficiency and simplicity of operation over the other systems known in the art.

It is a further object of this invention to provide a control system which is characterized by position control over the tool-bearing slide of the machine in the rapid traverse mode and feed rate control during the machining operation, being automatically convertible at a position selectable by the operator.

It is a still further object of this invention to provide an analog control system for a machine tool wherein slide movement under position control in the servoloop may be accommodated at a rapid traverse or feed rate by characteristics of the applied director signal.

It is still another object of this invention to provide a novel means for synchronizing the movement of the slide with rotation of the spindle.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 2 is a combined isometric view of a portion of a machine tool and circuit schematic of a portion of the control system for the machine tool;

Figure 1:
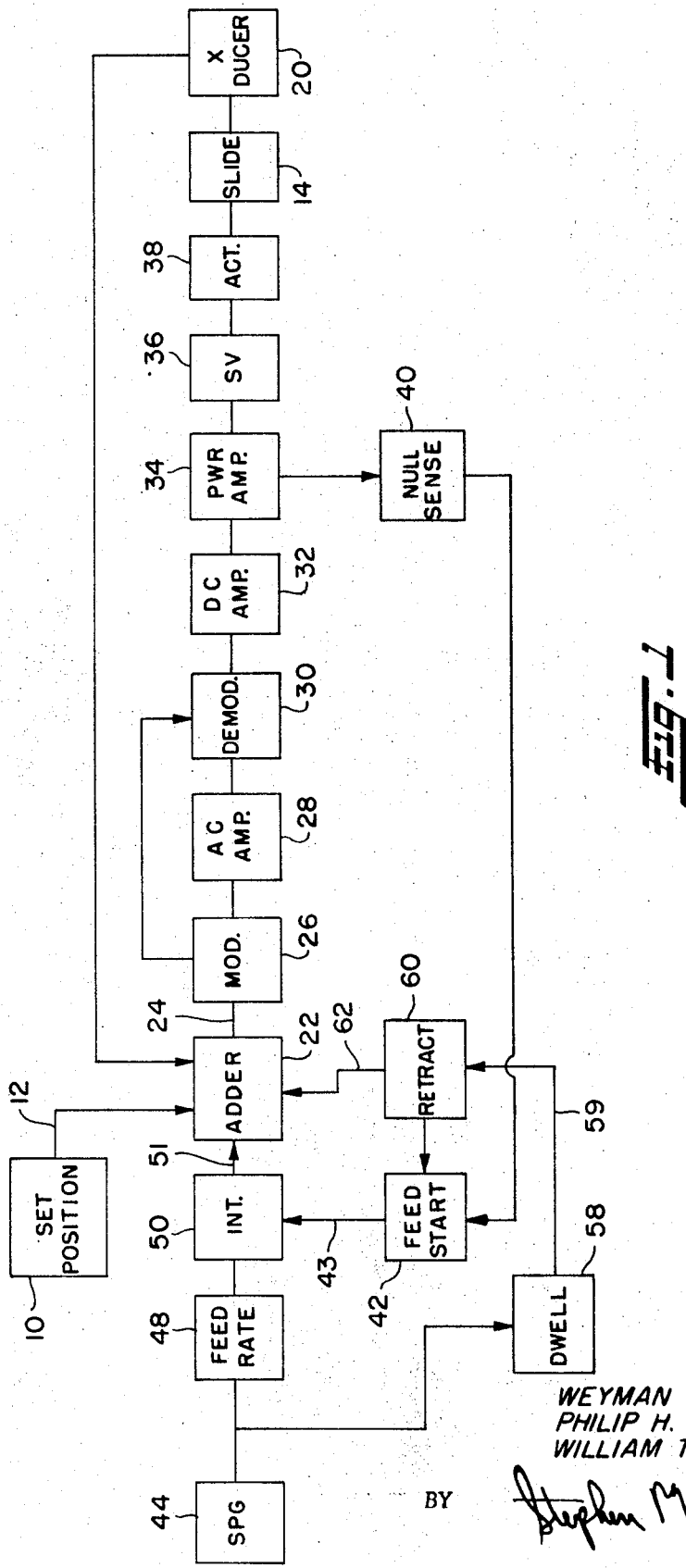
FIG. 1 is a block diagram of the control system of the invention.

FIGS. 3—5 are circuit schematics of the remainder of the control system of the invention.

A general understanding of the operation of this control system may be obtained by referring to FIG. 1, the block diagram of the complete system. The set position means 10 comprises a bank of switches which may be manually or tape operated to alter a resistance network and provide a DC voltage output on line 12 which is representative of the desired position at which the tool slide 14 switches from a rapid traverse into a feed mode. In this system, the actual position at any time of the slide 14 and the tool 15 are represented by a DC voltage of amplitude proportioned to displacement. Thus for example, when the slide 14 is in the fully retracted position 16, it is represented by a zero voltage signal. When the slide 14 is in its fully traversed position 17 and has completed the machining operation, it is represented by a suitable value of DC voltage which for purposes of this description will be 16 volts, although any other suitable range of voltages could be utilized. Intermediate positions of the slide 14, therefore, may be represented by a DC voltage level between 0 and 16 volts, and the slide 14 is shown in full lines in FIG. 2 at the midposition 18 or at a position represented by 8 volts of signal.

A position transducer 20 is mounted on a fixed portion of the machine tool and is calibrated to provide a voltage output in the same range of values. The movable element 21 of the transducer is connected directly to the slide 14. Thus, when it is desired to move the tool slide 14 to a particular position to initiate the machining portion of the cycle, appropriate switches on the set position means 10 are actuated to provide a position control signal, which for purposes of this description will be considered to be the midposition 18 of the tool slide traverse. The set position 10 signal and the feedback signal from the slide transducer 20 are combined in an adder 22 which continuously compares the two signals and provides an output voltage on line 24 proportional to the difference therebetween. Such output voltage is thus the error signal for the control system in this mode of operation and regulates the movement of the machine tool slide 14, such error signal being converted from a voltage to actual movement of the machine tool slide at a rate proportional to the magnitude of the error voltage within the unsaturated range of system. Large errors between the set position 10 and feedback signals create a saturation of the control system with the result that the slide 14 moves at a maximum desired velocity predetermined by the design of the physical components of the system and machine tool.

The conversion portion of the system includes a modulator 26 for converting the DC error signal to an AC signal for amplification by an AC amplifier 28 and subsequent conversion again to a DC signal by a ring demodulator 30. Such technique for boosting the signal obviates drifting and the like which can be troublesome in low level DC amplifiers; however, stable DC amplifiers could be used as well in this portion of the circuitry. The boosted error signal is then applied to a DC amplifier 32 and subsequently to a power amplifier stage 34, the output of which directly drives an electrohydraulic servovalve 36. The servovalve 36 is part of the hydraulic circuitry of the machine tool and need not be described in great detail other than to point out that the valve 36 controls flow of hydraulic fluid to a piston-cylinder actuator 38 which moves the appropriate slide of the machine tool. The servovalve 36 is of the proportional type and provides a quantity of fluid flow to the hydraulic actuator 38 in proportion to the amplitude of the signal obtained from the power amplifier stage 34 of the control system. Such fluid flow thus provides a controlled rate of movement of the slide 14 of the machine tool and consequently of the tool 15 carried by the slide.

It will be appreciated in this embodiment of the invention that when a set position 10 signal of 8 volts is initially supplied to the system, the tool slide 14 will be in the fully retracted position 16 due to the overdrive signal from the retract unit 60 and the slide transducer 20 will be providing an output of 0 volts. The combination of the signals in the adder 22 will, upon removal of the retract signal, initially produce an error signal of 8 volts and a corresponding movement of the tool slide 14 in a rapid traverse motion. As the tool slide 14 moves toward the desired midposition 18, the slide transducer 20 will relate the instantaneous position of the slide 14 by emitting a DC voltage of increasing amplitude. As the slide 14 closely approaches the desired position, the error signal will be reduced in value causing a corresponding reduction in the rate of traverse of the tool slide. As pointed out previously, a variable rate of movement of the slide 14 occurs only with error values within a small range, any larger signals causing saturation of the system and a maximum rate of movement of the slide.

A null sensing circuit 40 is provided which monitors the output of the power amplifier 34 and controls the state of the feed start flip-flop 42. When the output of the power amplifier 34 has reached a null condition which may be either zero voltage or a desired voltage close to zero, the null sensing circuit 40 will recognize this condition to change the stage of the feed start flip-flop 42 to an "on" condition.

When the tool slide 14 has reached the desired position for initiating the feed rate mode of operation as commanded by the feed start flip-flop 42, a signal will be provided on line 43 to cause control of the tool slide to be altered from a constant set position 10 signal to a varying input signal which determines the further rate of movement of the slide 14 at a feed rate for the machining operation.

The means for generating a feed signal comprise a spindle pulse generator 44 directly coupled to the spindle 46 of the machine tool to provide a pulse output of constant width and amplitude and at a frequency directly proportional to the spindle speed. Such signal representative of the spindle speed may be provided in many different manners and the teachings of this invention are not to be construed as limited to this particular pulse control embodiment. The spindle pluses are routed to a feed rate module 48 which may comprise a resistive network to be manually or electrically varied to determine the height of the pulses from the spindle pulse generator 44. The output of the feed rate module 48 is then delivered to an integrator circuit 50 which produces a ramp function output on line 51 or a DC voltage whose amplitude increases proportional to the rate of the pulses received from the spindle pulse generator. The integrator circuit 50 is a conventional operational amplifier circuit which may be switched into operativeness under direction of a command from the feed start flip-flop 42 on line 43.

The slope of the ramp function output of the integrator circuit 50 is dependent upon the quantity of charge received by the integrator in a given interval of time. Therefore, it may be seen that by maintaining the amplitude and width of the pulses at a constant value, the slope of the output signal of the integrator circuit 50 is directly proportional to the frequency of pulses received. The feed rate module 48 determines the amplitude of the pulses received from the spindle pulse generator 44 and provides the constant of proportionality between the output of the integrator circuit 50 and the pulse generator 44.

Thus, when the midposition 18 has been attained, the integrator circuit 50 will be turned on by the signal on line 43 from the feed start flip-flop 42 to start accumulating charges from the spindle pulse generator 44 to provide a ramp function output on line 51. This output voltage is then combined with the previous existing set position 10 voltage to create a new signal for further control of the tool slide 14. As is well understood in the art, the tool slide 14 will be moved at a rate proportional to the slope of the ramp function signal applied on line 51. This rate will be maintained due to the generation of an error signal indicative of the instantaneous difference between the sum of the set position and ramp signal voltages and the magnitude of the voltage representative of the actual slide position. Such movement at this desired rate will continue until the end position 17 of the slide is attained.

A pair of limit switches 54, 55 are mounted on a fixed portion of the machine tool and are actuated by a dog 56 carried on the movable portion of the slide 14 when the slide reaches either limit of its travel. When limit switch 55 is actuated by the dog 56 upon completion of the machining operation, it will energize the dwell timer 58. Forward movement of the slide 14 is stopped by contact with a positive mechanical stop. The integrator circuit 50 continues to accumulate pulses causing the system to again saturate, thereby biasing the slide 14 forcefully against the mechanical stop. The slide 14 will remain in this position for a time dependent upon the delay of the dwell timer 58 which, upon completion of its delay, emits a pulse on line 59 to change the condition of the retract flip-flop 60 thereby also resetting the feed start flip-flop 42 and providing an override signal into the adder 22 of the control circuitry via line 62. The signal from the retract flip-flop 60 will be a DC voltage of sufficient value to override all other voltages applied to the adder 22 to saturate the servo system and cause the slide 14 to move in a rapid traverse motion in the reverse direction to its fully retracted position 16. At this position limit switch 54 may be actuated to deenergize the system and maintain it in a state of preparedness for the next command signal which, after index of the machine spindles or of the tool slides may be initiated by a completion signal from start module 63.

The dwell timer 58 is an integrator type circuit receiving pulses from the spindle generator 44 through a selector switch which provides the selection of several time delay intervals. The dwell timer 58 provides a well known function for the control system of a machine tool in allowing the tool slide 14 to remain stationary at its end position 17 to relieve strains in the drive train for the tool slide as well as in the tool and its mounting.

The mode of operation to the control system just described covers standard slide actuation. However, it will be apparent that the apparatus of the invention may be controlled in different manners to provide special slide functions which are commonly utilized in this machine tool art. In the standard slide actuation before the start of the cycle the retract flip-flop 60 is energized to provide an over drive signal to the servovalve 36 holding the slide 14 in the full retract position. A start signal provided for example, by completion of the spindle carrier indexing, changes the state of the retract flip-flop 60 and causes the slide 14 to advance rapidly to the location commanded by the set position 10 signal. When this position is reached, the output of the power amplifier 34 goes to null and the null sensing circuit 40 energizes the integrator circuit 50 to cause the slide 14 to proceed in feed or metal cutting action. At the end of its traverse the slide 14 reaches a forward stop, a limit switch 55 is made to initiate the dwell timer 58 and after a short delay the retract flip-flop 60 is turned on causing the slide 14 to return to its original position 16 thus completing the cycle.

Special slide actions may be selected by means of a rotary switch (not shown) which controls the cycling of the slide. This switch may take the form of a plural pole multicontact rotary switch which interconnects the various portions of the control system to change the sequence of operations of the system. Similarly, it will also be obvious that the set position 10 means may take the form of a single resistance network which is programmable to provide different distance dimensions or alternatively, may comprise a plurality of set position resistance networks which are selectively switched into operativeness within the system. And, for example, it will be seen that a double feed mode of operation for this control system may be obtained by providing means for sensing slide position such that when the first position is reached, the slide rate will be changed to a second signal. For this function, the set position signal is clamped and remains in the control and two successive ramp functions are combined therewith.

A reverse feed function may also be provided in a relatively uncomplicated manner. In this mode the tool slide 14 proceeds normally to the forward limit 17 while an inhibitor circuit prevents switching the rates during this forward movement. The dwell timer 58 output is routed to the rate 48 and integrator 50 circuits instead of to the retract flip-flop and instead of retracting, the control is given a negative rate signal causing reverse feed action. When the slide 14 reaches the position set into the position sensing circuits, the circuit will generate a signal actuating the retract flip-flop 60 causing the tool slide 14 to be returned to its start position. Other functions such as a skip face function may be readily selected and provided for by this control system in a similar manner.

Although the description of operation of this control system is related only to a single slide of a machine tool, such machine normally comprises a plurality of tool slides operable simultaneously or sequentially to perform a plurality of machining operations. It will be obvious that the teachings of this invention may be related to a plurality of tool slides as well and in particular to an end and cross slide which might be associated with one cutting position. Thus, by suitable interconnection of the portions of the control circuitry described previously, any functions combining various slides may be provided for including a sequential action of the end and cross slides. Similarly, functions such as a straight withdraw of a slide may be accommodated by utilizing the dwell timer output for actuating the spindle brake.

Referring now to FIGS. 2—5, there is shown the circuit schematic diagram of the preferred embodiment of the control system of this invention together with a portion of a machine tool under control of this system. The spindle pulse generator 44, driven together with the spindle 46, chuck 64 and workpiece 65, may be any one of several conventional types of generators, the only requirement being that it emit pulses of constant amplitude and width at a frequency dependent upon the speed of rotation of the spindle 46. The feed rate module 48 in its simplest form consists of a potentiometer 66 having the output of the spindle pulse generator 44 connected across the resistance element and the selected pulse amplitude obtained from the movable slider of the potentiometer 66. The integrator circuit 50 or ramp function generator consists of a conventional operational amplifier 67 connected in an integrating mode and controlled by a relay 68 for initiating the integrating cycle. The contact 68a of the relay 68 is connected in series with a resistance and in parallel with the capacitor 69 which forms the feedback path for the integrator circuit 50. A closed contact 68a resets the integrator circuit 50 while the opening of the contact 68a energizes the circuit to accumulate pulses to form the ramp function at the output terminal 70.

The adder 22, modulator 26, AC amplifier 28 and demodulator 30 circuits of FIG. 1 are shown in detail in FIG. 3 and cooperate to form an error signal for application to the power portion of the system. The adder 22 and modulator 26 are combined in the circuitry and are effected by the summation of signals across the variable resistance of a field effect transistor 72. The characteristics of the field effect transistor 72 are well known in the art and comprise generally a voltage controlled resistive characteristic between the source 72a and drain 72b terminals of the transistor 72. A modulating signal of approximately 2.5 kc. is applied to the gate terminal 72c of the transistor 72 to modulate the DC level applied across the drain 72b and source 72a terminals of the transistor 72. The feedback signal from the slide transducer 20 on line 75 is applied at the junction of a pair of resistance elements 76 serially connected between the drain terminal 72b of the transistor 72 and ground. The set position 10 signal on line 12 and the ramp function signal on line 51 are combined on line 77 and are applied directly to the drain terminal 72b of the transistor 72. A gate circuit 78 consisting of a pair of resistors and a diode 92 is also connected to the drain terminal 72b and to the retract flip-flop 60 via line 62 and in the normal traversing condition is biased to a suitable negative DC level. Thus, the diode 92 in the gate circuit 78 will be back biased and will not affect the signals applied at the drain terminal 72b of the transistor 72. When a retract signal is received, however, a positive signal on line 62 will be applied to the gate 78 thereby forward biasing the diode and causing the drain terminal 72b of the transistor to reach a more positive level thereby overriding all of the signals applied at this point due to the forward current flow through diode 92.

The AC amplifier 28 consists of a four-stage transistor amplifier having an emitter follower 79 at the final output stage to provide a low impedance output on line 80 to the following circuitry. The amplifier 28 is conventional in design and because of the AC coupling obviates the drift problems inherent in small signal DC amplifiers. The amplified AC error signal is then applied on line 80 to the ring demodulator 30 which converts the signal to a DC push-pull signal on lines 82 for application to the power portion of the circuitry. Both the modulator 26 and demodulator 30 of this control system received their energization from a common oscillator signal applied at terminal 83 which facilitates synchronization of the two circuits.

The output of the demodulator 30 is applied to the DC amplifier 32 (FIG. 4) at terminals 82 which amplifier consists of a pair of operational amplifiers 83 connected in a push-pull arrangement. The amplified DC error signal is applied to the power amplifier stage 34 connected also in a push-pull arrangement, each side of which consists of a pair of direct coupled NPN transistors 85a, b and 86a, b. The output of the power amplifier 34 on lines 88a, b, c is connected to the electrohydraulic servovalve 36 causing displacement of the spool of the valve, at least for unsaturated signal levels, directly in proportion to the amplitude of the DC error signal and causing fluid flow to the hydraulic actuating cylinder 38 at a corresponding rate.

The null sensing circuitry 40 is also associated with the output of the power amplifier stage 34 and consists of a charging circuit connected to one side 88a of the push-pull output. When the level of the output signal on lines 88a drops to a sufficiently low value, diode 89 will be forward biased and the null sensing circuit 40 will act as a load upon one side of the feed start flip-flop 42 by way of connection 90 to change the state of the flip-flop 42. The feed start 42 and retract 60 stages of the control circuit consist of conventional flip-flop stages which provide two stable states of operation for controlling the remainder of the circuitry. As is well understood in the art, each of the flip-flops 42, 60 may be triggered to the alternate state by the application of a pulse at the triggering input or by a DC level applied to alter the biasing arrangement of the flip-flop. The output signals are usually obtained from the collector leads and provide one of two possible positive voltage levels in this particular embodiment of the invention. Thus, for example, the output of the retract flip-flop 60 is applied by way of line 62 to the gate circuit 78 controlling the override of the error signal for causing the slide 14 to be retracted to its initial position 16. When transistor 91 of this flip-flop 60 is conducting, as a result of a positive signal at terminal 97 from the start module 63, a low positive DC level will be applied on line 62 at the input of the gate circuit 78 thereby causing the diode 92 to be back biased as a result of the voltage divider action between the associated resistors. When transistor 91 of the retract flip-flop 60 becomes nonconducting as a result of a negative command from the dwell timer circuit 58 on line 93, line 62 will attain a high positive value causing a forward biasing of the diode 92 and a consequent application of a positive voltage value to the drain terminal 72b of the field effect transistor 72 thereby overriding the error signal.

The feed start flip-flop 42 operates in a similar manner to provide two levels of output voltage on line 94 as a result of input signals from the null sensing circuit 40 on line 90 or from the retract flip-flop 60 on line 95. The output signal on line 94 is applied to a transistor amplifier 96 for controlling relay 68 to initiate or reset the integrator circuit 50.

The dwell timer 58, as pointed out previously, provides a time delay to allow the tool slide 14 to dwell at its end position 17 for a short interval of time depending upon the speed of spindle rotation, in order to relieve strains in the mechanical drive train. The dwell timer 58 consists of suitable charging circuitry 100 for providing the time delay and further amplifiers 102 for providing discrete output states on line 93. A selector switch 104 at the input receives pulses from the spindle generator 44 on line 105 so that different resistances 107 may be switched into the charging circuit 100 for different delay intervals. Input terminal 108 is provided for connection to the forward and reverse limit switch 55 or to other suitable limit sensing circuitry for controlling the operation of the dwell timer circuit 58.

Although the electrical circuitry of this control system has not been described in great detail, much of the circuitry utilizes techniques standard in this field and will be understood by those familiar with this art. Many variations are possible in a system of this type and the teachings of this invention are not to be construed as limited to this particular embodiment. For example, variations are possible in individual circuit elements, the manner of generating the control signals and as pointed out previously, the dwell timer 58, retract 60 and feed start 42 modules may be interconnected in different manners to provide special slide functions such as double feed, reverse feed and skip face, other than the standard slide action described in detail.

Other modes of applying the principles of the invention may be employed, change being made as regards the details described, provided the features stated in any of the following claims or the equivalent of such be employed.

We, therefore, particularly point out and distinctly claim as out invention:

We claim:

1. In an automatic machine tool control system for producing relative movement between a workpiece and a machining tool, an analog servosystem for effecting the relative movement in response to a command signal, the servosystem being of the proportional position loop type wherein the instantaneous comparison of a feedback position signal and a command position signal provides an error signal for effecting the rate of relative movement, the command signal being a ramp signal having position information varying at a predetermined rate thereby to effect relative movement between the workpiece and the machining tool at a corresponding predetermined rate, and means operative upon discrete electrical quantities for applying a command position signal to the servosystem, comprising a pulse generator providing constant voltage pulses, a resistive divider network for altering the amplitude of the pulses in proportion to the desired rate of relative movement, and an integrator circuit for accumulating such pulses to provide a changing signal having a slope indicative of the rate of relative movement, said changing signal being a ramp voltage output.

2. A control system for a machine tool of the automatic type wherein a slide is moved at a rate related to rotation of a spindle of the machine tool for performing the machining operation comprising retract means for providing a signal for causing movement of the tool slide in a reverse direction at a rapid traverse rate, set position means for providing a signal indicative of the extent of forward movement of the tool slide at a rapid traverse rate, rate means for providing a signal indicative of the rate of forward movement of the tool slide during the machining operation, feedback means for providing a signal representative of the instantaneous position of the tool slide, means for combining the signals of the set position means and the feedback means to provide a difference signal, servodrive means responsive to the difference signal for moving the tool slide, means for comparing the signals of the set position means and the feedback means and for providing a comparison signal when equality is attained, means responsive to the comparison signal of the comparing means for combining the signals of the rate means and the feedback means to provide a second difference signal for application to said servodrive means for further movement of the tool slide, and means for sensing completed movement of the tool slide and for combining the signals of the retract means and the feedback means to provide a third difference signal for application to said servodrive means for reverse movement of the tool slide to a fully retracted position.

3. A control system as set forth in claim 2 further including a dwell timer operative in response to the completed movement sensing means for delaying the combining of the signals of the retract means and the feedback means.

4. A control system as set forth in claim 2 wherein the means for combining the signals of the rate means and the feedback means further combines the signal of the set position means to provide a second difference signal.

5. In an automatic machine tool control system for producing relative movement between a workpiece gripped in a rotatable spindle of the machine tool and a machining tool, a servosystem for effecting the relative movement in response to a command signal, said servosystem being of the analog proportional position loop type wherein the instantaneous comparison of a feedback position signal and a command position signal provides an error signal for effecting the rate of relative movement, the feedback and command signals being varying continuous signals indicative instantaneously of the actual and desired relative positions, respectively, the signals being electrical quantities having amplitudes proportional to such positions, and means for applying a command position signal to said servosystem, the command signal being a ramp function having a slope indicative of a predetermined rate of relative movement and containing position information varying at a predetermined rate, said means comprising a generator driven by the spindle for providing a changing voltage output proportional to the speed of spindle rotation, means for varying the output of said generator in proportion to the desired rate of relative movement, and accumulator means responsive to the output of said generator for providing a changing signal having a slope indicative of the rate of relative movement.

6. An automatic machine tool control system for effecting relative movement between a workpiece supported in a rotatable spindle of the machine tool and a machining tool comprising a closed loop position servocontrol for effecting the relative movement in response to position command signals, a first voltage generator for providing a first command signal to said servocontrol to effect relative movement between the workpiece and the machining tool from a retracted position to a relatively adjacent position, means connected to the spindle for generating an output representative of the rotational velocity of the spindle, a ramp voltage generator adapted to receive the output of said spindle generating means to provide a ramp voltage having a slope directly related to the spindle velocity, the ramp voltage being a second command signal to effect relative movement at a preselected rate during contact between the workpiece and the machining tool, a third voltage generator for providing a third command signal to effect relative movement in a reverse direction to a retracted position, means for sensing relative positions of the workpiece and machining tool for providing discrete signals representative thereof, switching means responsive to said sensing means for applying said command signals to said servocontrol, said switching means including means for combining two of said command signals for simultaneous application to said servocontrol to effect relative movement as a function of the combination of command signals, and time delay means responsive to the signals of said sensing means for interrupting said switching means for a predetermined interval.